US005748940A

United States Patent [19]
Angelo et al.

[11] Patent Number: 5,748,940
[45] Date of Patent: May 5, 1998

[54] SECURE UPDATING OF NON-VOLATILE MEMORY

[75] Inventors: Michael F. Angelo, Houston; Craig A. Miller, Tomball; David R. Wooten, Spring, all of Tex.

[73] Assignee: Compaq Computer Corporation, Houston, Tex.

[21] Appl. No.: 516,276

[22] Filed: Aug. 17, 1995

[51] Int. Cl.⁶ .................................................. G06F 12/16
[52] U.S. Cl. ........................ 395/490; 398/186; 398/486; 398/493
[58] Field of Search ................................ 395/490, 491, 395/186, 188.01, 430, 429, 482, 483, 493, 486; 380/4

[56] References Cited

U.S. PATENT DOCUMENTS

| | | | |
|---|---|---|---|
| 4,590,552 | 5/1986 | Guttag et al. | 395/490 |
| 5,293,610 | 3/1994 | Schwarz | 395/491 |
| 5,388,267 | 2/1995 | Chan et al. | 395/652 |
| 5,465,341 | 11/1995 | Doi et al. | 395/183.06 |
| 5,475,839 | 12/1995 | Watson et al. | 395/650 |
| 5,511,184 | 4/1996 | Lin | 395/734 |
| 5,522,076 | 5/1996 | Dewa et al. | 395/700 |
| 5,550,997 | 8/1996 | Ip et al. | 395/430 |
| 5,557,771 | 9/1996 | Kawaguchi et al. | 395/490 |
| 5,587,849 | 12/1996 | Kori et al. | 360/69 |
| 5,634,079 | 5/1997 | Buxton | 395/892 |

Primary Examiner—Tod R. Swann
Assistant Examiner—Hiep T. Nguyen
Attorney, Agent, or Firm—Fish & Richardson, P.C.

[57] ABSTRACT

A secure start-up system for a computer enables a flash memory to be reset in a secured way. Various operations are carried out to make sure that the reset is an authorized one, and to avoid unauthorized, e.g. virus, infiltration. These operations include multiple tests to avoid the probability of the reset being unauthorized. Any one or more than one of the following can be used. Flashing is only authorized when a special flash enable bit is set in the non-volatile memory. This flash enable bit is reset during every startup cycle. Flashing is only authorized from a cold boot as opposed from a warm boot. This minimizes the possibility of a computer routine authorizing flashing by a software reset. Flashing is only authorized from a floppy. This prevents a virus from writing the flashing routine to the boot sector of a non-removable disc. The user is warned prior to flashing, and asked to confirm. Finally, contents of the flashing routine can be checked using some kind of checking algorithm such as a secure hash algorithm.

74 Claims, 2 Drawing Sheets

SECURE UPDATING OF NON-VOLATILE MEMORY

FIELD OF THE INVENTION

This invention relates to secure updating of nonvolatile memory.

BACKGROUND AND SUMMARY OF THE INVENTION

The present invention relates to a computer system which has a re-programmable start-up memory that is protected against unauthorized reprogramming. More specifically, the present invention defines a start-up system for a computer which takes certain steps to avoid unauthorized alteration of the computer's non-volatile memory.

Initial turn on of a computer executes instructions from a specified start-up routine. Many computers store the start-up routine in read only memory. It has become more common in recent years to store the start-up routine in non-volatile random access memory ("NVRAM"). This allows the contents of the start-up routine (the basic input or output system or "BIOS") to be changed after initial manufacture to upgrade the start-up routine. The act of changing the content of the non-volatile memory is called "flashing" the memory.

The ability to change the BIOS, however, has opened a unique hole for viruses such as the "Meningitis" virus or other computer-infiltrating agents. Viruses often invade the operation of a computer in various ways. Many viruses render the computer subsequently unusable. If the BIOS is damaged, the computer cannot be started or starts in an unintended way. Hence, the computer operation is compromised. If sufficiently damaged, e.g., reset to zero, the BIOS cannot even be reprogrammed. This requires professional repair, e.g. shipping the computer back to the vendor for reprogramming.

Various measures have been taken to avoid virus infiltration into the BIOS.

For example, vendors have taken steps to avoid unauthorized reprogramming of the BIOS. A physical switch has been used. The switch must be set before the BIOS can be upgraded. People sometimes do not, however, reset the switch after they set the switch to upgrade for the first time. This leaves a later susceptibility to a virus resetting or infiltrating the NVRAM.

Another solution used by some manufacturers is to prevent the NVRAM from reset at any time except on initial boot-up. This solution allows the flash to be reset only when the system is first booted. One of the realizations made by the present inventor, however, is that this action does nothing to avoid the update routine itself being virus-infiltrated. This also does not prevent a virus from invading the boot sector of the hard disk in anticipation of the next boot cycle.

Moreover, once the virus-writers find out about a possible virus block, they find ways around the block.

The present invention takes various steps to prevent the contents of the NVRAM from being reprogrammed unless certain security measures are met. These security measures include any one or more of the following: (Using multiple different techniques makes it more difficult for a virus to circumvent any security measures.)

Flashing is only allowed on initial power-up to prevent a virus from resetting the NVRAM via a software reset.

Flashing is only allowed from a floppy disk, and not from the hard disk. This prevents a virus from infecting the boot sector of the hard disk, and then infecting the NVRAM the next time that the computer is power cycled.

Some aspect of the updating routine is checked to detect tampering.

Warnings are produced indicating that the system is to reflash. This prevents silently reflashing the system as is done by certain viruses.

The system prevents re-flashing unless a specific bit in the NVRAM has been set during a previous operation time. That bit is reset during every startup cycle.

Other advantages and features will become apparent from the following description and from the claims.

BRIEF DESCRIPTION OF THE DRAWINGS

These aspects will be described with reference to the accompanying drawings, in which.

DESCRIPTION OF THE PREFERRED EMBODIMENTS

Figure 1:
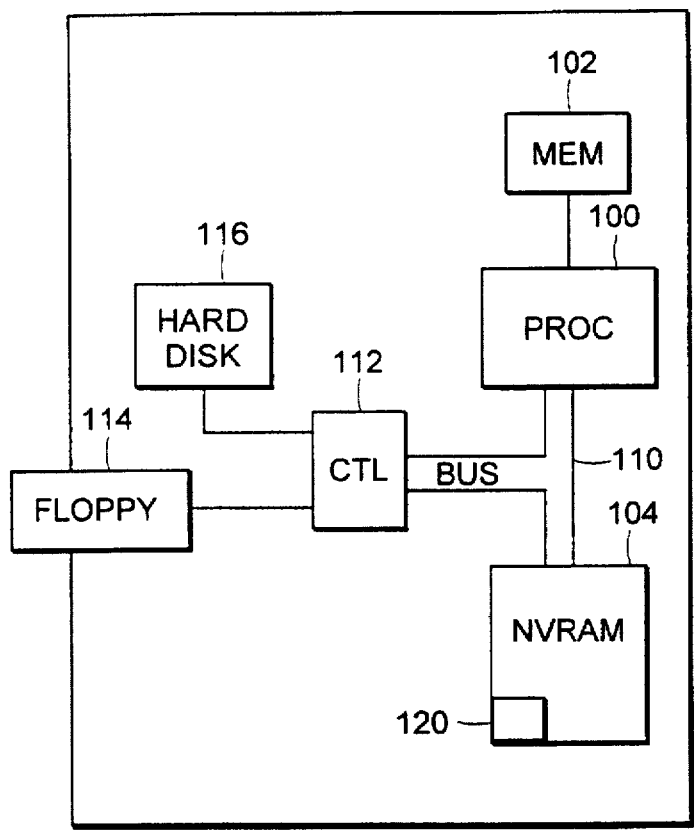
FIG. 1 shows a block diagram of the computer system.

All of the components of the system of FIG. 1 are common to both a personal computer and to mainframe computers. Processor 100 operates according to stored instructions to carry out certain operations. The instructions are stored in a working memory ("RAM"), shown as memory 102.

Figure 2:
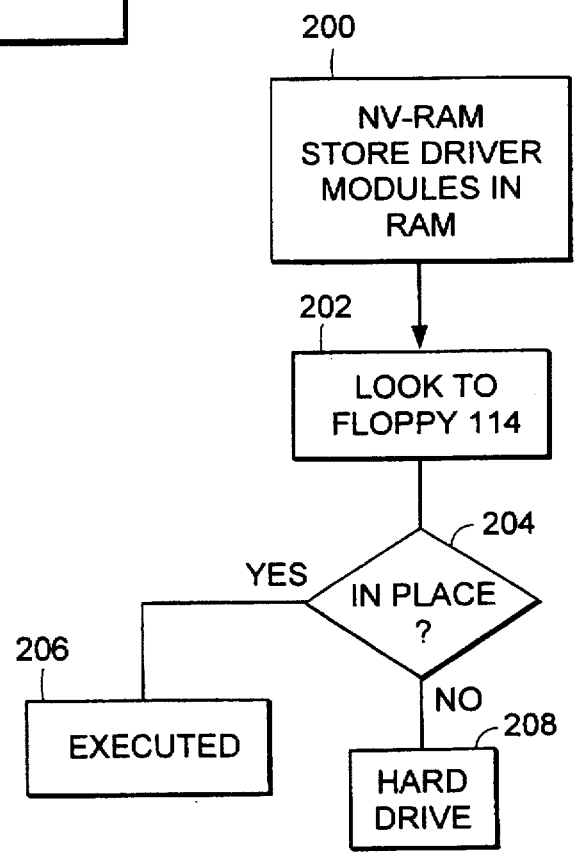
FIG. 2 shows a flowchart of operation of a start-up routine.

On power-up, processor 100 always executes instructions from a certain area in NVRAM 104. These instructions define the initial start-up instruction sequence. The start-up routine operates to carry out the functions described in the flowchart of FIG. 2.

At step 200, driver modules are read from the NVRAM 104, and stored into the working memory 102. These driver modules include software instructions which enable the computer to carry out some of its housekeeping functions, including a driver module to interact with information on the data bus and with the software memory controller 112. The memory controller 112 can be, for example, IDE or SCSI controllers providing the interface between the address/data bus 110, removable media, e.g. floppy disk 114, and non-removable media, e.g. hard disk 116.

Once these initial modules are stored into RAM, further start-up instructions are obtained from the controller 112. The computer first looks for appropriate instructions on the floppy disk 114 at step 202. If the floppy disc is in place at step 204, commands from the boot sector of the floppy are executed at step 206 to store additional drivers and modules into memory 102. If the floppy is not in place, the information on the boot sector of the hard disk 116 is executed at step 208 to store the drivers into memory 102.

It is known that the contents of NVRAM can be altered based on a flashing routine, including an executable routine and data, which is stored on either the floppy disk or on the hard disk as part of the boot sector and/or boot sequence. The flash routine is read from the boot sector during a start-up sequence. This flash routine carries out various operations to remove the old routine which is resident in NVRAM 104, and to store a new routine. That new routine includes data that is stored into the NVRAM, and which represents the new, updated, start-up routines.

A first embodiment of the invention uses one or more of the following techniques to reflash NVRAM 104. These techniques, when properly used, make it more likely that the rewriting into memory will be secure.

(1) A flash bit 120 must be set in a specified location of NVRAM 104 to indicate that a subsequent flash update will occur. Flash is only allowed to occur when flash enable bit 120 is set. Flash enable is carried out by running a program which sets an otherwise unused bit in NVRAM 104. The flash enable bit is reset every time the system boots, whether or not the system is reflashing during that re-boot cycle, which prevents any subsequent reflash until the flash bit is again set.

(2) The system may only reflash when initiating a power up cycle (a "cold boot"). A "warm boot", that is, rebooting with the power on, will not allow reflash of NVRAM 104. Since the computer must be physically powered-down before re-flashing, no driver or routine can be used to reflash the system within any computer program. Without this technique, a software routine which restarts the computer (a warm boot) could not re-flash the NVRAM.

(3) The reflashing can only be carried out from data stored on a removable media, e.g. a floppy disk. Reflashing cannot be carried out from the hard disk. This prevents a virus from storing a routine on the hard disk which can later be used to reflash the non-volatile RAM. Since such a routine cannot be executed from the hard disk boot sector, the virus would have to store the offending program on the boot sector of the removable disc that was in the drive at that time. That same floppy would need to be in the drive on a subsequent boot-up, and would need to contain a bootable routine (e.g., a copy of a command interpreter stored on its boot sector). This makes the virus operation much less likely to succeed.

(4) The system prompts the user for confirmation prior to allowing flash to continue. This prevents flashing from occurring without the user knowing about it. It also requires that the user confirm that he wants flashing to occur. NVRAM cannot, therefore, be silently reflashed, e.g. as part of a virus program.

(5) The integrity of the flashing information is checked. Preferably, this is done by using the secure hash algorithm to check the flashing routine to ensure that those contents have not been altered.

The contents to be written in the non-volatile memory can also be checked. These contents include digital data that is executed as a program. This data can be checked according to the present invention. This is done by determining a digital signature of the data when it is recorded, using a hash code technique. The hash code is then encrypted using the private key of a public key cryptography system. At the time of memory update, the signature is decrypted using the public key. The decrypted signature is compared against an original to determine if the contents have been changed.

Combining the measures described above provides the maximum amount of protection. But any of these features may be used by itself, or they may be used in any combination to achieve varying amounts of protection.

Figure 3:
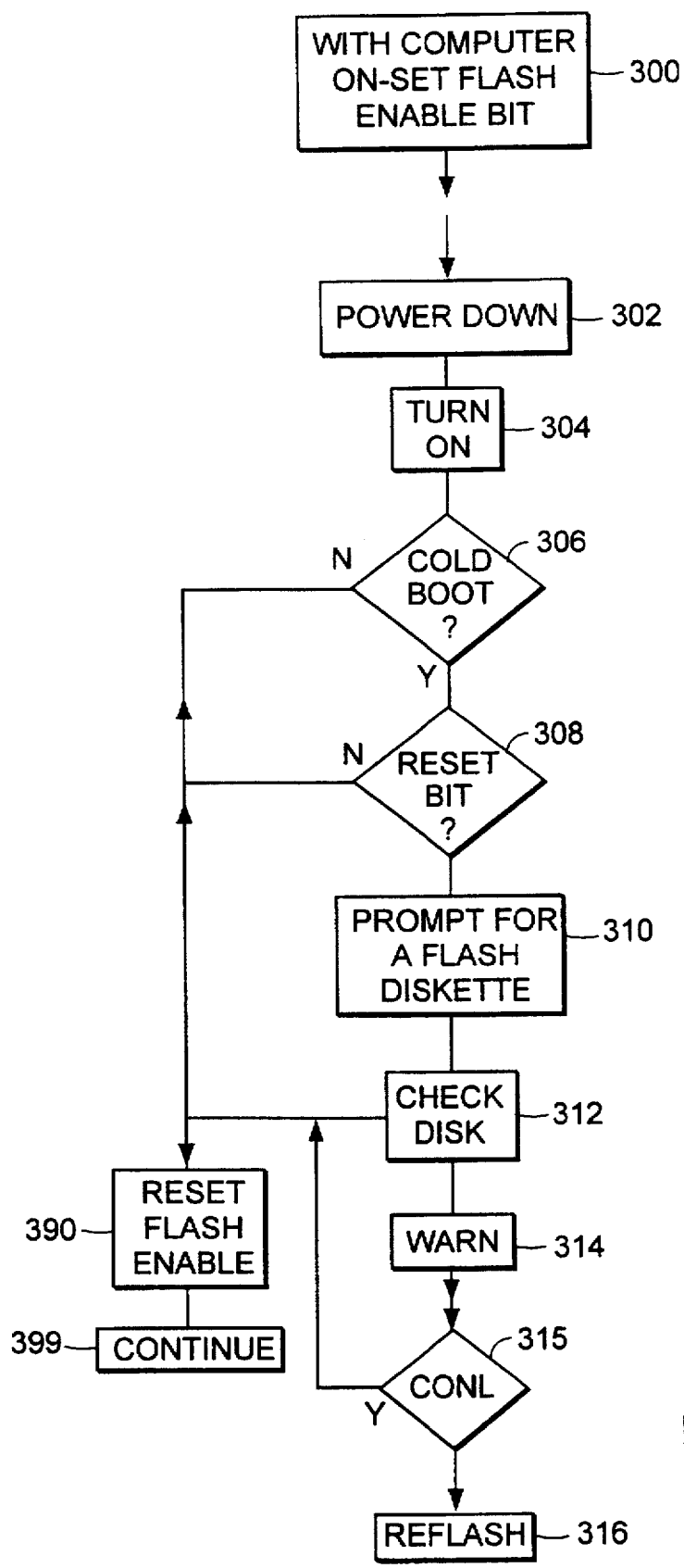
FIG. 3 shows a flowchart of operation of the secure system of the present invention.

The flash protection embodiment operates by using the processor 100 to execute the functions described in the flowchart of FIG. 3. FIG. 3 shows the flowchart of operations which are carried out to flash the NVRAM.

At step 300, with the computer on, a program is executed which commands that the flash enable bit 120 be set.

Step 302 represents powering-down the computer system.

Step 304 represents the computer reset.

Step 306 detects whether the current turn-on is a cold boot—that the system is being booted during a powering up cycle. In contrast, a warm boot is a reset of the processor caused by software or manual reset without disconnecting the power. The invention allows reset only on initial power-on to avoid software-based resets. One way to determine whether cold boot versus warm boot is occurring is by detecting if there are any contents in memory that are being overwritten. Other techniques could also be used.

If step 306 determines that the present cycle is not a cold boot cycle, flow passes to step 390 where the flash enable bit is reset. This reset occurs during each start-up cycle, whether or not flashing is being done. After that, flow passes to the step 399, labeled "continue", which represents the continuing processing carried out by the computer.

If step 306 detects that the present startup is a cold boot, the reflash bit contents are checked and detected at step 308. If the reflash bit is set, the user is prompted for a flash diskette at step 310. The system monitors the source of the flashing, and will only accept flash data from a floppy disk. The flash diskette includes at least the data that is used to update the non-volatile memory 104, and can also include the executable file that is used to copy the contents into the NVRAM 104. The executable program has a secure hash algorithm or digital signature preferably the FIPS 180 standard. This operation generates a signature indicative of the whole contents of the executable code. Other techniques can be used to verify the contents, including calculating a checksum or other similar technique.

At step 312, the executable is checked against the signature. If the test passes, then control passes to step 314 which warns the user that the system is about to be reflashed. The set-up program preferably includes multiple warnings that the system is about to be reflashed. User confirmation is required at step 315. Failure of confirmation causes control to pass to step 390 where the flash enable is reset, followed by continuing without reflashing at step 399.

After warnings and appropriate confirmation, the reflashing occurs at step 316.

Although only the preferred embodiment has been described above, the claims which follow describe the intended metes and bounds of the invention, including many modifications which are possible in the preferred embodiment.

What is claimed is:

1. A flash-protected computer system, comprising:
   a processor;
   a non-volatile memory storing predetermined instructions to be executed by said processor on initial start-up; and
   an element that provides instructions to update contents in said non-volatile memory, said element being arranged to effect at least two predetermined security features, and to allow new data to be written into the non-volatile memory only when both of said at least two predetermined security features have specified states indicating that updating the contents of said non-volatile memory is likely to be secure,
   wherein said predetermined security features include a predetermined flash enable value in said non-volatile memory being in a predetermined state, and
   a determination that said system is being reset from a power off state.

2. A system as in claim 1, wherein said predetermined security features include
   said instructions used to update said contents being stored only on a removable medium.

3. A system as in claim 2, wherein said removable medium includes a floppy diskette.

4. A system as in claim 1, wherein said predetermined security features include
- a determination of whether a warning has been sent to an operator of the computer indicating that contents of the non-volatile memory will be changed.

5. A system as in claim 1 or 4, wherein said predetermined security features further comprise a determination of whether the operator has confirmed that the contents should be changed.

6. A system as in claim 1, wherein said predetermined security features include
- a checking code, indicative of integrity of a program which is used to write the new data into said nonvolatile memory, being in a predetermined state.

7. A system as in claim 6, wherein said checking code comprises a security hash code, said predetermined state of said checking code being a positive comparison of said security hash code against stored data indicative of a proper hash code.

8. A system as in claim 1, wherein said predetermined security features include
- a determination that new data which is to be stored into said non-volatile memory is stored only on a removable media.

9. A system as in claim 1, wherein said predetermined security features include
- an indication that said user has been warned that the non-volatile memory is about to be reprogrammed.

10. A system as in claim 9, wherein said predetermined security features further include
- an indication that the user has confirmed that the non-volatile memory should be reset.

11. A system as in claim 1, wherein said predetermined security features include
- a determination that a memory content rewriting routine meets a predetermined integrity test.

12. A system as in claim 1, wherein said predetermined security features include said information being stored on a removable media only, and
- a determination that a user has been warned that the non-volatile memory is about to be reprogrammed.

13. A system as in claim 1, wherein said predetermined security features include
- a determination that new data which is to be stored into said non-volatile memory is stored only on a removable media and
- a determination indicative of proper integrity of a flashing routine used to reset the non-volatile memory.

14. A system as in claim 1, wherein said predetermined security features include
- a determination that the user has been warned that altering reset of the non-volatile memory is about to occur, and
- a determination that a routine used to reset the memory contents passes a predetermined test.

15. A method of resetting a memory in a computer system, comprising:
- determining if the computer has been started in a predetermined way, wherein said predetermined way comprises a turn on from a power off condition which detects that a flash enable value in the non-volatile memory is set to a predetermined state;
- reading information indicative of new information to be stored in a non-volatile memory of the computer;
- confirming that an aspect of the new information meets a predetermined criterion; and
- storing the new information in the non-volatile memory only if the determining indicates that the computer has been started in the predetermined way, and the aspect of the information meets the predetermined criterion.

16. A method as in claim 15, wherein said confirming comprises determining whether a program used to store data in the non-volatile memory passes a predetermined test.

17. A method as in claim 15, wherein said confirming comprises determining whether the program is on a removable media, and enabling the non-volatile memory to be changed only when the program is on the removable media.

18. A method as in claim 15, wherein said confirming comprises determining whether the user has been warned that contents of non-volatile memory are going to be changed.

19. A method as in claim 18, wherein said confirming further comprises determining whether information which will be used to process data in the non-volatile memory passes a predetermined test.

20. A method as in claim 15, wherein said confirming comprises determining whether information which will be stored in the non-volatile memory passes a predetermined test.

21. A method of securely altering contents of a non-volatile memory in a computer, comprising:
- carrying out a first operation to determine if altering of the non-volatile memory will be secure;
- carrying out a second operation different than the first operation, to determine if altering of the non-volatile memory will be secure; and
- writing new contents into the non-volatile memory only when said first and second operations both indicate that the memory writing is authorized,
- wherein said first operation includes determining if a predetermined flash enable value in said non-volatile memory is in a predetermined state, and said second operation includes determining if said system is reset from a power-off state.

22. A method as in claim 21, wherein said second operation comprises determining if said instructions used to update said contents are stored on a removable medium.

23. A method as in claim 22, wherein said removable medium includes a floppy diskette.

24. A method as in claim 21, wherein said second operation comprises determining if a warning has been sent to an operator of the computer indicating that rewriting of the non-volatile memory will occur.

25. A method as in claim 21 or 24, wherein said second operation further comprises determining whether the operator has confirmed that the rewriting should occur.

26. A method as in claim 21, wherein said second operation comprises determining if a checking code, indicative of integrity of a program which is used to set the new data into said non-volatile memory, meets a predetermined criteria.

27. A method as in claim 26, wherein said checking code is a security hash code and said second operation comprises comparing said security hash code against stored data indicative of a proper hash code.

28. A method as in claim 21, wherein said second operation includes a determination that new data which is to be stored into said non-volatile memory is stored only on a removable media.

29. A method as in claim 21, wherein said second operation includes determining if said user has been warned that the non-volatile memory is going to be reprogrammed.

30. A method as in claim 29, wherein said second operation further includes an indication that the user has confirmed that the non-volatile memory should be reset.

31. A method as in claim 21, wherein said second operation includes detecting an indication that a flashing routine meets a predetermined integrity test.

32. A method as in claim 21, wherein said first operation includes determining if said information is stored on a removable media only.

33. A method as in claim 21, wherein said first operation includes determining if new data which is to be stored into said non-volatile memory is stored only on a removable media, and said second operation comprising obtaining an indication indicative of proper integrity of a flashing routine used to reset the non-volatile memory.

34. A method as in claim 21, wherein said first operation includes determining if the user has been warned that reset of the non-volatile memory is about to occur.

35. A secure update computer system, comprising:
a processor operating to execute instructions which are applied thereto;
a working memory, storing instructions for execution by said processor;
a processor memory, including software instructions to be executed by said processor; and
a non-volatile memory, storing initial startup instructions to be executed by said processor, contents of said non-volatile memory being alterable under control of said processor;
said non-volatile memory including a flash enable bit therein and said processor programmed to set said flash enable bit during a predetermined operation preparing for altering contents of the non-volatile memory, and said processor subsequently controlling said non-volatile memory to be altered only when said flash enable bit is set during a time of memory update, and an additional operation also indicates that altering of said non-volatile memory has been requested by an operator.

36. A system as in claim 35, wherein said additional operation includes an element which tests to determine if said computer is being reset from a power off state and allows said non-volatile memory to be reset only if so.

37. A system as in claim 35, wherein said flash enable bit is reset every time the processor is reset.

38. A system as in claim 35, wherein said additional operation includes a determination that a user has been warned that altering of the contents of the non-volatile memory are to occur.

39. A system as in claim 38, wherein said additional operation further includes an indication that confirmation has been received that memory contents are to be altered.

40. A system as in claim 35, wherein said additional operation is an element that detects whether a program used to set new information in the non-volatile memory meets a predetermined criteria.

41. A system as in claim 40, wherein said predetermined criteria includes a signature from a secure hash algorithm.

42. A method of securely resetting contents of a non-volatile memory in a computer system, comprising:
determining, on initial reset of the computer system, whether a predetermined bit in non-volatile memory has been set in a way which enables altering of non-volatile memory to occur;
carrying out an additional detection of a type which makes it less likely that resetting of the non-volatile memory is being effected by a software routine; and
only if said predetermined bit is set, and said additional detection is positive, altering the contents of the non-volatile memory,
wherein said additional detection includes a determination that said system is being reset from power off.

43. A method as in claim 42, wherein said additional detection includes an indication that new information to be stored in the non-volatile memory is stored on a removable medium only.

44. A method as in claim 43, wherein said removable medium includes a floppy diskette.

45. A method as in claim 42, wherein said additional detection includes determining if the operator has been warned that the non-volatile memory will be altered.

46. A method as in claim 42, wherein said additional detection comprises determining if the operator has confirmed that the non-volatile memory is to be altered, and resetting the non-volatile memory only if so.

47. A method as in claim 42, wherein said additional detection comprises determining whether contents of a flashing routine used to alter the contents of the non-volatile memory meet a predetermined criteria.

48. A method as in claim 47, wherein said predetermined criteria includes a signature generated by a secure hash algorithm.

49. A secure computer system, comprising:
a processor, operating to execute instructions which are applied thereto;
a source of instructions for said processor, said source of instructions including a controller, controlling a removable memory source and a non-removable memory source; and
a non-volatile memory, selectively alterable under control of said processor, and storing instructions from which said processor initially starts up;
said processor including information which enables contents of said non-volatile memory to be altered only when information used to reset the contents of the non-volatile memory are received from the removable memory source only,
wherein said processor also carries out an operation to determine whether the computer system is being reset from a power off state, and whether a routine used to reset the non-volatile memory meets a predetermined criteria that includes a signature from a secure hash algorithm and the processor enables the contents of the non-volatile memory to be altered only if so.

50. A system as in claim 49, wherein said processor also carries out an operation to confirm to the operator that the non-volatile memory needs to be reset, and carrying out an operation to alter the non-volatile memory only if so.

51. A system as in claim 49, wherein said removable memory source includes a floppy diskette.

52. A method of rewriting contents of a non-volatile memory in a computer system, comprising:
determining that a user desires to alter contents of the non-volatile memory;
determining if information to alter the contents is originating from a removable disc drive;
allowing rewriting of the contents of the non-volatile memory only if the information is from a removable disc drive;
determining whether a flash enable value in the non-volatile memory is set to a predetermined state, and allowing rewriting of the contents of the non-volatile memory only if so; and
determining whether the system is being reset from a power off state, and allowing rewriting of the contents of the non-volatile memory only if so.

53. A method as in claim 52, further comprising warning the user that altering is about to occur, and allowing rewriting of the contents of the non-volatile memory only after the user has been warned.

54. A method as in claim 52, further comprising a routine for altering the non-volatile memory, and further comprising comparing the routine against a predetermined criteria, and allowing contents of the non-volatile memory to be rewritten only if the comparing indicates a specified relation between said routine and said criteria.

55. A method as in claim 54, wherein said predetermined criteria includes a signature of a secure hash algorithm.

56. A secure computer apparatus, comprising:
a processor operating to execute instructions applied thereto;
a memory controller, including an associated removable medium and an associated non-removable medium; and
a non-volatile memory, including stored instructions which are to be executed by said computer on startup, and said non-volatile memory including a first element which allows contents thereof to be altered,
said memory controller including a second element which determines whether the system is resetting from a power off state and whether a security check is satisfied, said processor allowing altering contents of said non-volatile memory only when said second element determines that the computer is resetting from the power off state and the security check is satisfied,
wherein the security check includes said processor determining a source from which the non-volatile memory will be reset, said processor allowing altering contents of said non-volatile memory only when said source is the removable medium, and
wherein the security check further includes said processor checking a specified memory element in said non-volatile memory, said processor allowing altering contents of said non-volatile memory only when said specified element includes a specified state therein.

57. An apparatus as in claim 54, wherein the security check includes said processor executing an instruction which warns the user that rewriting of contents of the non-volatile memory is going to occur, said processor enabling said rewriting only after said user has been warned.

58. An apparatus as in claim 54, wherein the security check includes said processor executing instructions to check contents of a routine used for rewriting contents of the non-volatile memory.

59. An apparatus as in claim 58, wherein said routine includes a secure hash algorithm.

60. An apparatus as in claim 56, wherein said removable medium includes a floppy diskette.

61. A method of rewriting contents in a memory of a computer system, comprising:
receiving new contents to be written into a nonvolatile memory of a computer system;
determining whether the computer system is resetting from a power off state and whether a security check is satisfied; and
allowing writing of the new contents into the nonvolatile memory only if the computer is resetting from the power off state and the security check is satisfied,
wherein the security check includes investigating a specified flash enable bit in the non-volatile memory, writing of new contents of the non-volatile memory being enabled only if the flash enable bit is in a predetermined state.

62. A method as in claim 61, wherein the security check includes determining whether the new contents for resetting the memory are originating from a removable medium only, writing of new contents of the non-volatile memory being allowed only if so.

63. A method as in claim 62, wherein said removable medium includes a floppy diskette.

64. A method as in claim 61, wherein the security check includes warning the user that reset of the non-volatile memory is to occur, writing of new contents of the non-volatile memory being enabled only after the user has been warned.

65. A method as in claim 61, wherein the security check includes confirming whether a routine used to reset the non-volatile memory meets a predetermined criteria, writing of new contents of the non-volatile memory being enabled only if so.

66. A method as in claim 65, wherein said confirming comprises checking a signature of a secure hash algorithm.

67. A flash-protected computer system, comprising:
a processor, operating to execute instructions applied thereto, and having a function whereby the processor reads predetermined initial instructions on start-up;
a non-volatile but changeable memory, having instruction areas therein, and providing the initial instructions from which said processor operates; and
an element cooperable with said processor, to provide update information to update contents in said nonvolatile memory, said element checking at least first and second predetermined features, and preventing any new data from being written into the non-volatile memory except when said at least two predetermined features have specified results, said processor executing a first routine to check contents of update information as said first feature, and executing a second routine to update contents of the non-volatile memory only if the first routine indicates that the update routine meets a predetermined criteria,
wherein said predetermined criteria includes a secure hash algorithm, wherein said secure hash algorithm is detected based on the executable program which updates contents of the non-volatile memory, and
wherein said second feature allows said non-volatile memory to be updated only when said computer is reset from a power off state.

68. A system as in claim 67, wherein said second feature allows said non-volatile memory to be reset only when contents to be set in said non-volatile memory are received from a removable medium.

69. A system as in claim 67, wherein said second feature includes a determination that a user has been warned that the contents of the non-volatile memory are to be altered.

70. A claim as in claim 69, wherein said second feature includes indication that the user has confirmed that contents are to be altered.

71. A system as in claim 67, wherein said second feature includes a detection indicating that a predetermined area in said non-volatile memory is in a predetermined state program used to set new information in the non-volatile memory meets a predetermined criteria.

72. A method of updating a startup routine in a computer, comprising:
obtaining an update routine used to update contents of the startup routine in the computer;
checking an aspect of the update routine, wherein said checking comprises obtaining a signature indicative of some portion of the update routine and comparing said signature against a pre-stored signature wherein said signature includes a secure hash algorithm;

using the update routine to rewrite contents of a non-volatile memory used to start the computer, only if said checking indicates that said update routine includes said aspects;

making a determination that said system is being reset from power off and executing said using step only if so; and determining that the new information to be stored in the non-volatile memory is stored on a floppy disc only and executing said using step only if so.

73. A method as in claim 72, further comprising warning the user that reset of the non-volatile memory is about to occur and executing said using step only it so.

74. A method as in claim 73, further confirming from the user that reset of the non-volatile memory is about to occur, and using the update routine when it does so occur.

* * * * *